(12) United States Patent
Enzmann et al.

(10) Patent No.: US 6,839,414 B1
(45) Date of Patent: Jan. 4, 2005

(54) CALL PREVENTION DEVICE AND METHOD

(75) Inventors: Mark J. Enzmann, Roswell, GA (US); Robert T. Moton, Alpharetta, GA (US); Samuel N. Zellner, Dunwoody, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 174 days.

(21) Appl. No.: 10/044,391

(22) Filed: Jan. 10, 2002

(51) Int. Cl.[7] .......................... H04M 15/06; H04M 1/66
(52) U.S. Cl. ........................ 379/142.06; 379/142.01; 379/142.05; 379/188; 379/199; 379/211.01; 379/70; 379/88.11
(58) Field of Search .................. 379/142.01, 142.04, 379/142.05, 142.06, 142.08, 188, 191, 196, 197, 199, 200, 207.13, 207.14, 207.15, 211.01, 213.01, 215.01, 114.14, 139, 137, 70, 88.11, 88.19, 88.2, 88.21, 88.22, 88.23, 93.02, 93.03, 93.04, 93.23; 455/410, 411, 412, 414, 415, 417

(56) References Cited

U.S. PATENT DOCUMENTS

| | | | | | |
|---|---|---|---|---|---|
| 5,388,150 A | * | 2/1995 | Schneyer et al. | ...... | 379/142.01 |
| 5,440,620 A | * | 8/1995 | Slusky | ................... | 379/100.07 |
| 5,524,145 A | * | 6/1996 | Parker | ................... | 379/210.02 |
| 5,999,613 A | * | 12/1999 | Nabkel et al. | .......... | 379/215.01 |
| 6,160,877 A | * | 12/2000 | Tatchell et al. | ............. | 379/197 |
| 6,266,524 B1 | * | 7/2001 | Dee et al. | ................... | 455/406 |
| 6,298,122 B1 | * | 10/2001 | Horne | ..................... | 379/93.09 |
| 6,456,706 B1 | * | 9/2002 | Blood et al. | ................. | 379/188 |

* cited by examiner

*Primary Examiner*—Quoc D. Tran
(74) *Attorney, Agent, or Firm*—Kirkpatrick & Lockhart LLP

(57) ABSTRACT

A call prevention device. The device includes a caller ID detection unit for detecting caller ID data transmitted over a telecommunication network before a connection is established when a call is made by a calling party. The device also includes a processing unit in communication with the caller ID detection unit for retrieving a caller profile from a caller profile database in response to the caller ID data and for comparing the caller profile with the caller ID data, the processing unit further for incrementing a call total value when the caller profile and the caller ID data match favorably, and the processing unit further for generating a message when the call total value exceeds a user defined value.

13 Claims, 4 Drawing Sheets

CALL PREVENTION DEVICE AND METHOD

BACKGROUND OF THE INVENTION

1. Field of the Invention

The present invention relates to caller identification (ID) technology and caller ID data as it is provided by telephone companies through a telephone network that generally enables a user to view the telephone number of the calling party and possibly other information relating to the calling party.

2. Description of the Invention Background

Telephone users generally desire an increasing number of features and functions to assist them in handling and preventing escalating numbers of unwanted incoming calls. One of the methods currently used to assist in the prevention of calls is the utilization of caller ID technology. Caller ID service capability is typically provided through a telephone network by a telecommunication service provider. A dedicated terminal or feature in a device such as a telephone or answering machine that has caller ID capability is specifically designed to read and display the caller ID data relating to the calling party that are transmitted over a telecommunications network to the called party. The caller ID data, received from the telecommunication service provider, are generally displayed on a display device to inform the called party of the caller name and/or number. Once the caller ID data are displayed, the called party may choose to either accept the call or allow the call to continue until the call is either answered by an answering device or the calling party terminates the call.

Problems with conventional caller ID systems stem from the limitations of such systems to dispose of calls efficiently without the called party having to take any action. With a standard caller ID system, the called party either has to actively read the caller ID number or has to let the phone ring until some other device disposes of the call or the calling party terminates the call. Either scenario is unfavorable to a called party that receives a large volume of undesirable calls. The constant ringing of the phone, checking the caller ID data, or listening to countless numbers of messages left by unsolicited parties can be annoying and time-consuming.

SUMMARY OF THE INVENTION

The present invention is directed to a call prevention device. The device includes a caller ID detection unit for detecting caller ID data transmitted over a telecommunication network before a connection is established when a call is made by a calling party. The device also includes a processing unit in communication with the caller ID detection unit for retrieving a caller profile from a caller profile database in response to the caller ID data and for comparing the caller profile with the caller ID data, the processing unit further for incrementing a call total value when the caller profile and the caller ID data match favorably, and the processing unit further for generating a message when the call total value exceeds a user defined value.

DETAILED DESCRIPTION OF THE INVENTION

Figure 1:
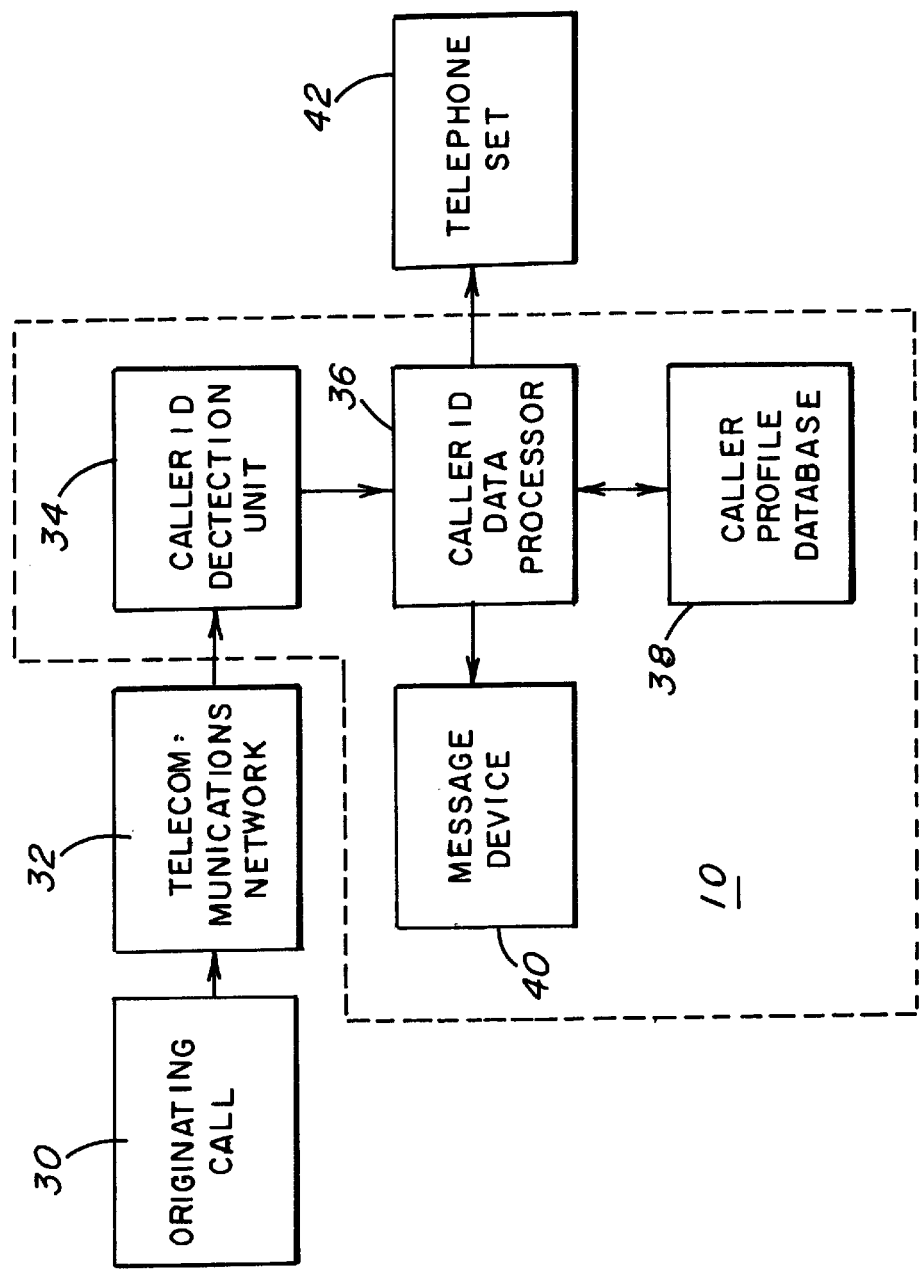
FIG. 1 is a block diagram of an embodiment of a call prevention device.

Referring now to the drawings for the purpose of illustrating the invention and not for the purpose of limiting the same, the block diagram in FIG. 1 shows an embodiment of a call prevention device 10. The call prevention device 10 generally determines whether an originating call 30, coming through a telecommunications network 32 such as, for example, the PSTN (public-switched telephone network), is to be prevented. The call prevention device 10 generally comprises a caller ID detection unit 34, a caller ID data processor 36, a caller profile database 38, and a message device 40 according to one embodiment of the invention. The call prevention device 10 is connected to a telecommunications device, such as a telephone set 42 for routing an acceptable originating call 30 to the telephone set 42.

Figure 2:
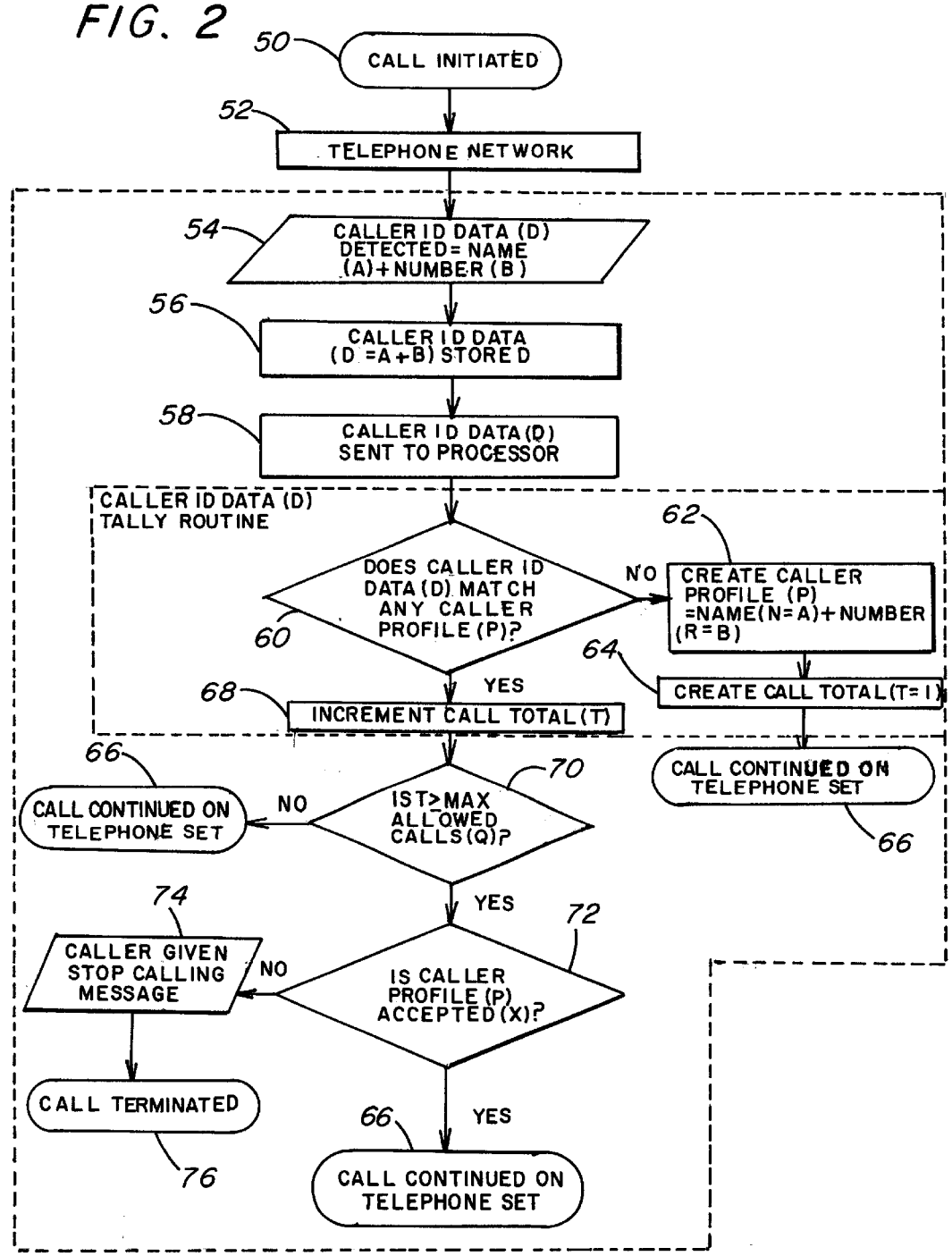
FIG. 2 is a flowchart of an embodiment of a process performed by the call prevention device of FIG. 1.
Figure 3:
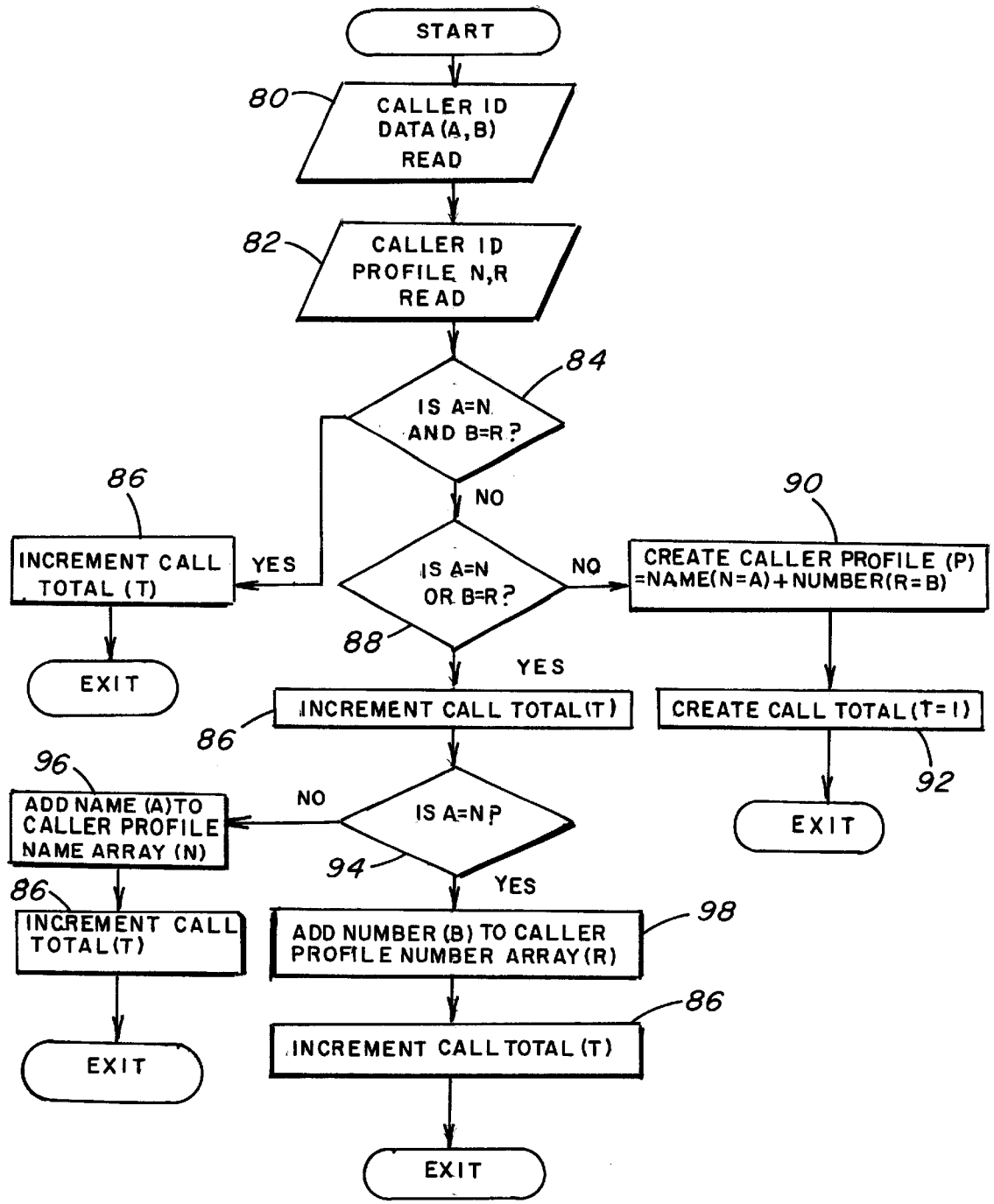
FIG. 3 is a flowchart of an embodiment of a caller ID data tally routine that is performed by the call prevention device of FIG. 1.

In an embodiment of the caller ID data processor 36 of the present invention, a caller ID processing program, described hereinbelow in connection with FIGS. 2 and 3, is stored in a memory device (not shown) of the call prevention device 10. The memory of the call prevention device 10 is, for example, a RAM (random access memory), a ROM (read-only memory), a PROM (programmable ROM), an EPROM (erasable PROM), or an EEPROM (electronically erasable PROM). The memory of the call prevention device 10, or other allocated memory of the aforementioned types, is further capable of storing incoming caller ID data (designated by "D"), caller profiles (designated by "P") in a caller profile database 38, and entries of accepted callers not to be prevented from connecting to the telephone set 42.

As shown in FIG. 2, the originating call 30 is initiated at block 50 by a calling party through a telephone network 32 at block 52. The originating call 30 is detected at block 54 by the caller ID detection unit 34, which monitors the phone line for caller ID signals, stores the caller ID data D at block 56 and routes the caller ID data D at block 58 to the caller ID data processor 36. The incoming caller ID data D are separated into two categories, the name of the caller (designated by "A") and the number of the caller (designated by "B"), and then stored at block 56 by the memory of the call prevention device 10. The caller ID data D, comprised of A and B, is then routed at block 58 to the caller ID data processor 36.

The program code instructions cause the caller ID data processor 36 to compare the caller ID data D at block 60 which are stored at block 56 in the memory of the call prevention device 10, with the caller profile in the caller profile database 38. This comparison at block 60 begins what will be understood as the caller ID data D tally routine.

The caller profile P consists of a name of a previous caller (designated by "N"), and a telephone number of a previous caller (designated by "R"). If the caller profile P cannot be found, the program code instructions cause the call prevention device 10 to create a caller profile P at block 62 consisting of N and R. The call prevention device 10 will then create a call total (designated by "T") at block 64 to begin to tally each originating call 30 that matches the caller profile P. Once the originating call 30 has a caller profile P and a call total T, the originating call 30 is continued at block 66 on the telephone set 42 before a subsequent ring occurs after receiving the caller ID data D. If a match is found, after A and B are compared at block 60 to N and R, then the call total T is incremented at block 68. This is the end of the caller ID data D tally routine.

In the event where a match is found and the call total T is incremented at block 68, the call total T is evaluated at block 70 as to whether the call total T is greater than or equal to the maximum allowed calls (designated by "Q"). The maximum allowed calls Q is generally a value entered by the user of the call prevention device 10. In the case where the call total T is not equal to or greater than the maximum allowed calls Q, the originating call 30 is continued at block 66 on the telephone set 42 before a subsequent ring occurs after receiving the caller ID data D.

Where the call total T is equal to or greater than the maximum allowed calls Q, the caller profile P of the originating call 30 is routed to be checked at block 72 against an accepted caller profile (designated by "X"). The accepted caller profile X is entered by the user of the call prevention device 10, thus permitting acceptable callers to bypass the exclusion of calls to be prevented. If the caller profile P of the originating call 30 matches an accepted caller profile X, the originating call 30 is continued at block 66 on the telephone set 42 before a subsequent ring occurs after receiving the caller ID data D. If the caller profile P of the originating call 30 does not match an accepted caller profile X, the originating call 30 is determined to be of the class of calls to be prevented and is given a message at block 74 before the call prevention device 10 terminates the originating call 30 at block 76 prior to a subsequent ring after receiving the caller ID data D.

The message given at block 74 to the caller of the originating call 30 can include several different options. The message at block 74 may include an audible response to the caller that the originating call 30 is unsolicited and undesired. The message at block 74 may also include an audible response stating that the name of the caller N and the number of the caller R is known and that the caller has called T times. Persons skilled in the art will recognize that the message given at block 74 may be substituted or replaced with other information or various personalized messages. This would provide added versatility and customization capabilities for the user of the call prevention device.

Referring now to FIG. 3, an embodiment of the caller ID D tally routine of FIG. 2 is shown. The program code instructions cause the caller ID data processor 36 to perform the caller ID data D tally routine in the course of processing. The caller ID D tally routine begins with caller ID data D (A, B) being read at block 80 from memory. The caller profile P (N,R) is then referenced at block 82 and first compared at block 84 to the caller ID data D (A,B). In this first comparison at block 84, an exact match is being checked for A with N, and B with R. If both A is equal to N and B is equal to R, then the call total T for that caller profile P is incremented at block 86.

The second comparison at block 88 occurs where A does not equal N or B does not equal R, or where A does not equal N and B does not equal R. The second comparison at block 88 is to determine whether A is equal to N or B is equal to R. Where neither of the inquiries of the second comparison at block 88 is true, it is decidedly understood that the originating call 30 must be a new caller or otherwise a caller without a caller profile P. A caller profile P is then created at block 90, storing the name N and the number R of the originating call 30 in the caller profile database 38. A call total T is then created at block 92 to be incremented at block 86 when the caller makes subsequent calls.

In the event that A is equal to N or B is equal to R in the second comparison at block 88, the program code instructions cause the call prevention device 10 to increment the call total T at block 86 for the particular caller profile P that corresponds to the matching value A or B. Where A is equal to N or B is equal to R, a match is determined to have been made for purposes of preventing unwanted calls. This will prevent a caller from changing their caller ID data slightly to circumvent the call prevention device 10. If either the name A or the number B of the originating call 30 matches a value in the caller profile P, the call total T will increment at block 86.

Caller profile P is understood to contain values N and R. Where either A equals N or B equals R, but not both of these is true, the call prevention device 10 determines which of the values does not match at block 94. Caller profile P is then updated to include the value that does not match the incoming caller ID data D (A, B) at blocks 96 and 98. If A is not equal to N at block 94, then A must be the value to be added to the array of N values at block 96 and the call total T is incremented at block 86. Otherwise, B must be the value to be added to the array of R values at block 98 as block 88 determined that either A equals N or B equals R, and block 94 determined that A did equal N. After B is added to the array of R values at block 98, call total T is incremented at block 86.

Figure 4:
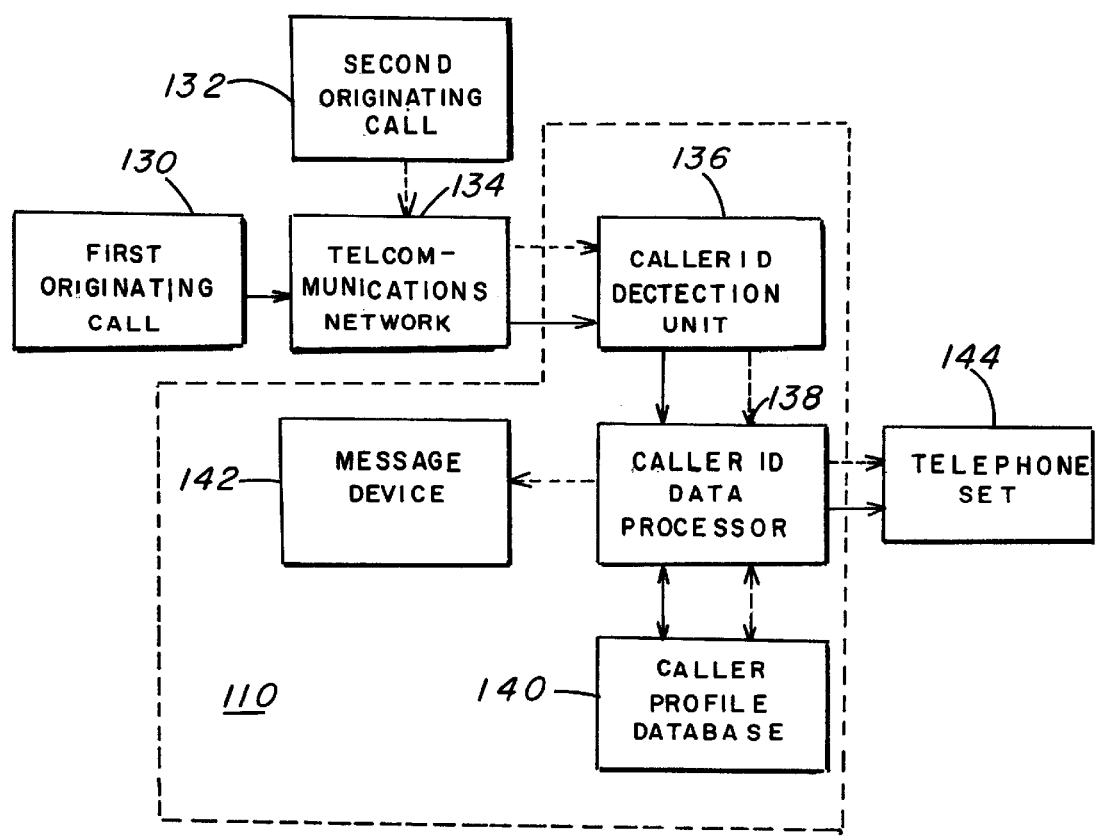
FIG. 4 is a block diagram of another embodiment of a call prevention device.

Referring now to FIG. 4, another embodiment of a call prevention device 110 is shown. When a first originating call 130 has already established a connection, the call prevention device 110 generally determines whether a second originating call 132, coming through a telephone network 134, is to be prevented. The call prevention device 110 generally comprises a caller ID detection unit 136, a caller ID data processor 138, a caller profile database 140, and a message device 142 according to one embodiment of the invention. The call prevention device 110 may be connected to a telephone set 144 for routing an acceptable second originating call 132 to the telephone set 144 for notifying the called party that a call is waiting to be answered.

The call prevention device 110 operates similarly in the prevention of calls to that of the cell prevention device 10 described hereinbefore. In this embodiment, the call prevention device 110 is provided with a second line in which to route the second originating call 132. The second originating call 132 can be determined as either an acceptable call, where it will subsequently go to call waiting on the telephone set 144, or it will be determined to be a call to be prevented and will be routed to the message device 142.

Whereas particular embodiments of the invention have been described herein for the purpose of illustrating the invention and not for the purpose of limiting the same, it will be appreciated by those of ordinary skill in the art that numerous variations of the details, materials and arrangement of parts may be made within the principle and scope of the invention without departing from the invention as described in the appended claims.

What is claimed is:

1. A call prevention device, comprising:
    a caller ID detection unit for detecting caller ID data transmitted over a telecommunication network before a connection is established when a call is made by a calling party to a called party; and
    a processing unit in communication with the caller ID detection unit for retrieving a caller profile from a caller profile database in response to the caller ID data, wherein the caller profile includes caller ID information relating to at least one prior calling party that has placed a call to the called party, and wherein the caller ID information relating to the at least one prior calling party has been collected from the call that the at least one prior calling party has placed to the called party, and the processing unit for comparing the caller profile with the caller ID data, the processing unit further for incrementing a call total value when the caller profile and the caller ID data match favorably, and the processing unit further for generating a message when the call total value exceeds a user defined value, wherein the message includes an audible warning that includes at least the caller ID data and the total call value.

2. A call prevention device, comprising:

a caller ID detection unit for detecting caller ID data transmitted over a telecommunication network before a connection is established when a call is made by a calling party; and a processing unit in communication with the caller ID detection unit for retrieving a caller profile from a caller profile database in response to the caller ID data and for comparing the caller profile with the caller ID data, the processing unit further for incrementing a call total value when the caller profile and the caller ID data match favorably, and the processing unit further for generating a message when the call total value exceeds a user defined value, wherein the message includes an audible warning that includes at least the caller ID data and the total call value.

3. The device of claim 2, wherein the processing unit is further for allowing the call to proceed to a call connecting device when the call total value does not exceed the user defined value.

4. The device of claim 3, wherein the call connecting device includes a telephone set.

5. The device of claim 3, wherein the call connecting device includes a computer.

6. The device of claim 2, wherein the caller ID data include at least a caller name and a caller number.

7. The device of claim 2, further comprising an accepted caller database for permitting a call from an accepted caller to bypass routing of the processing unit so as to continue the call through a connecting device.

8. The device of claim 2, wherein the processing unit is further for supplementing the caller profile with the caller ID data.

9. The device of claim 7, wherein the connecting device includes a telephone set.

10. The device of claim 7, wherein the connecting device includes a computer.

11. The device of claim 2, wherein the processing unit is further for disconnecting the call after the audible warning is issued to the calling party.

12. The device of claim 2, wherein the processing unit is further for transferring the call to an answering device if a connection is not established.

13. The device of claim 2, further comprising a messaging unit.

* * * * *